United States Patent
Hanafusa et al.

[11] Patent Number: 5,752,382
[45] Date of Patent: May 19, 1998

[54] DEVICE FOR DETERMINING AN ABNORMAL DEGREE OF DETERIORATION OF A CATALYST

[75] Inventors: Toru Hanafusa, Susono; Michihiro Ohasi, Mishima, both of Japan

[73] Assignee: Toyota Jidosha Kabushiki Kaisha, Aichi, Japan

[21] Appl. No.: 686,164

[22] Filed: Jul. 24, 1996

[30] Foreign Application Priority Data

Jul. 25, 1995 [JP] Japan .................. 7-189154

[51] Int. Cl.⁶ .................................... F01N 3/28
[52] U.S. Cl. .................................... 60/277
[58] Field of Search .................... 60/274, 277

[56] References Cited

U.S. PATENT DOCUMENTS

| | | | |
|---|---|---|---|
| 5,060,473 | 10/1991 | Nakagawa | 60/277 |
| 5,177,463 | 1/1993 | Bradshaw et al. | 60/277 |
| 5,355,671 | 10/1994 | Maus et al. | 60/277 |
| 5,435,172 | 7/1995 | Pelters et al. | 60/277 |
| 5,560,200 | 10/1996 | Maus et al. | 60/277 |
| 5,610,844 | 3/1997 | Maus et al. | 60/277 |
| 5,626,014 | 5/1997 | Hepburn et al. | 60/277 |
| 5,630,315 | 5/1997 | Theis | 60/277 |

FOREIGN PATENT DOCUMENTS

| | | |
|---|---|---|
| 4-60106 | 2/1992 | Japan . |
| 7-71233 | 3/1995 | Japan . |
| WO93/20340 | 10/1993 | WIPO . |

*Primary Examiner*—Willis R. Wolfe

[57] ABSTRACT

A device for determining an abnormal degree of deterioration of catalyst of a catalytic converter, arranged in an internal combustion engine exhaust system, is disclosed. The device comprises a temperature sensor for measuring a temperature of the catalyst and an electronic control unit which assumes a temperature of the catalyst on the basis of the engine operating condition and calculates a ratio of a varying value of the measured temperature by the temperature sensor to a varying value of the assumed temperature and determines that the degree of deterioration of the catalyst is abnormal when the ratio is smaller than a predetermined value.

3 Claims, 4 Drawing Sheets

1

DEVICE FOR DETERMINING AN ABNORMAL DEGREE OF DETERIORATION OF A CATALYST

BACKGROUND OF THE INVENTION

1. Field of the Invention

The present invention relates to a device for determining an abnormal degree of deterioration of a catalyst.

2. Description of the Related Art

A catalyst system is usually arranged in an exhaust passage to purify the exhaust gas. Once the catalyst system deteriorates excessively, the catalyst system cannot purify the exhaust gas sufficiently. Accordingly, it is necessary to determine an abnormal degree of deterioration of the catalyst, to inform the driver about the deterioration, and to urge the driver to exchange the catalyst for a new one.

The exchange costs much money and requires much time. Accordingly, it is necessary to determine the abnormal degree of deterioration of a catalyst precisely. National Publication No. 6-508414 discloses a device for determining the abnormal degree of deterioration of a catalyst. The device assumes a temperature of the catalyst on the basis of a current engine operating condition. When the assumed temperature reaches a basic temperature which is higher than a purification starting temperature of the catalyst, the device measures an actual temperature thereof. If the measured temperature is lower than the basic temperature, the device determines that a degree of deterioration of the catalyst is abnormal because the purification starting temperature of the catalyst rises or the purification exothermic reaction thereof becomes poor.

The purification starting temperature varies according to the harmful materials content of the exhaust gas and the like. The harmful materials content cannot be assumed precisely on the basis of the engine operating condition. Accordingly, the assumed temperature of the catalyst cannot be precise so that the device cannot determine precisely if the degree of deterioration of the catalyst is abnormal.

SUMMARY OF THE INVENTION

Therefore, an object of the present invention is to provide a device for determining an abnormal degree of deterioration of a catalyst which is capable of determining accurately if the degree of deterioration thereof is abnormal.

According to the present invention, there is provided a device for determining the abnormal degree of deterioration of catalyst of a catalytic converter arranged in an internal combustion engine exhaust system, comprising: measuring means for measuring a temperature of the catalyst; assuming means for assuming a temperature of the catalyst on the basis of the engine operating condition; calculating means for calculating a ratio of a varying value of the measured temperature by the measuring means to a varying value of the assumed temperature by the assuming means; and determining means for determining that the degree of deterioration of the catalyst is abnormal when the ratio is smaller than a predetermined value.

The present invention will be more fully understood from the description of preferred embodiments of the invention set forth below, together with the accompanying drawings.

2

Figure 2:
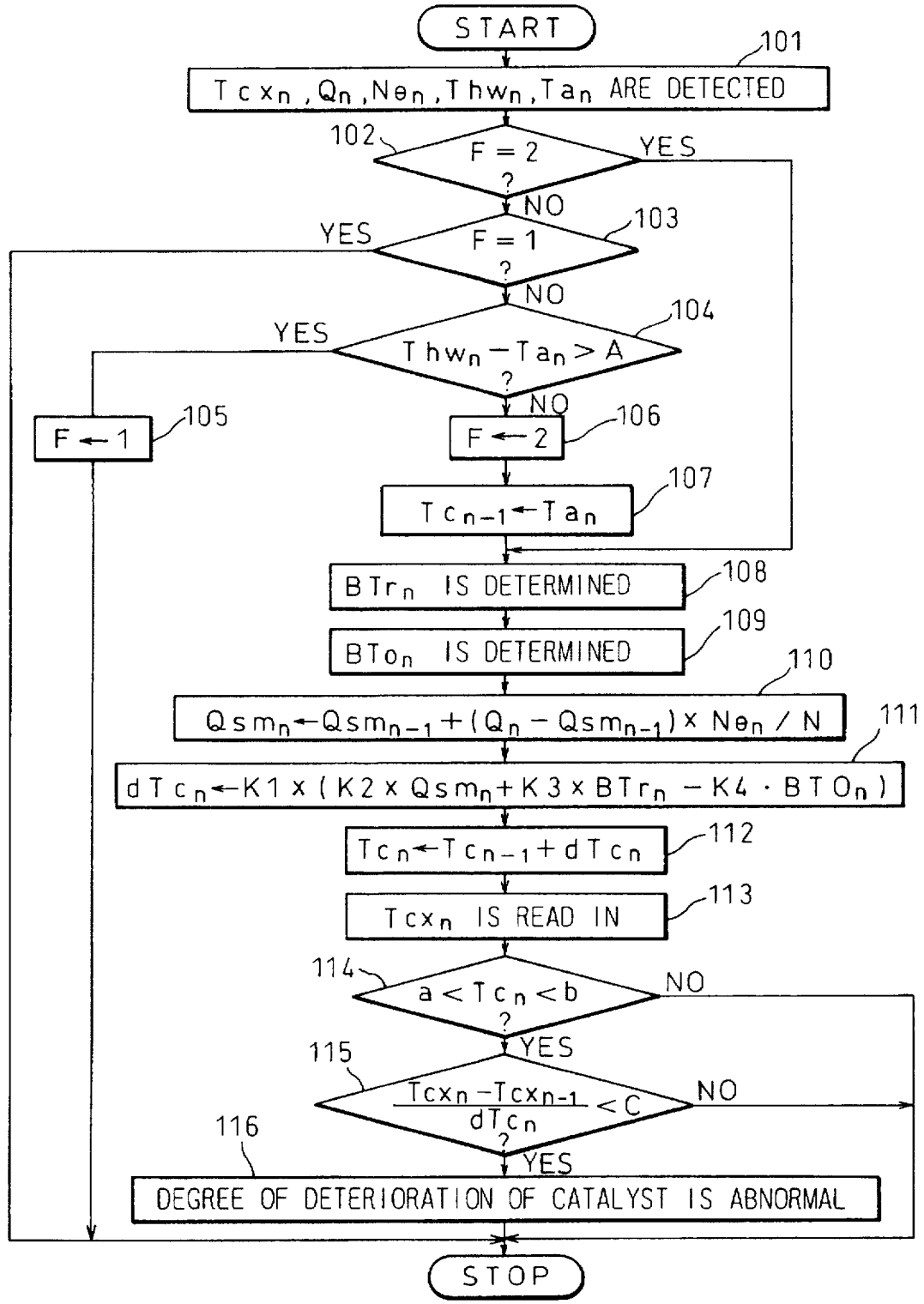
Figure 3:
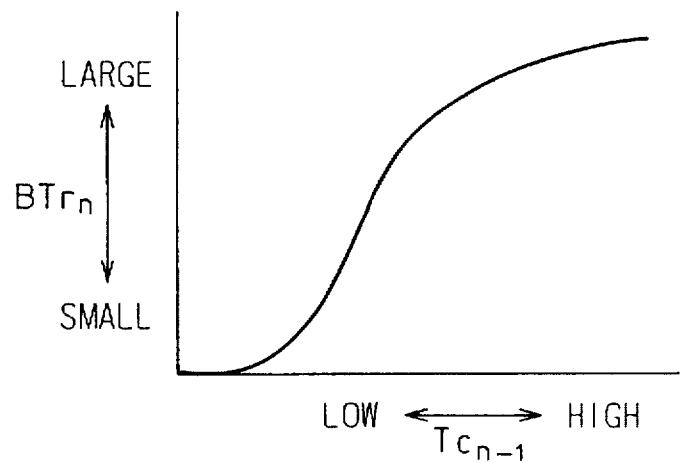
Figure 4:
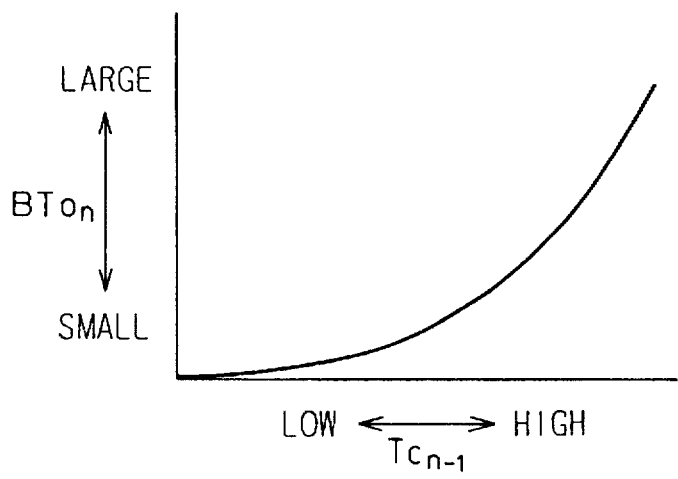
Figure 5:
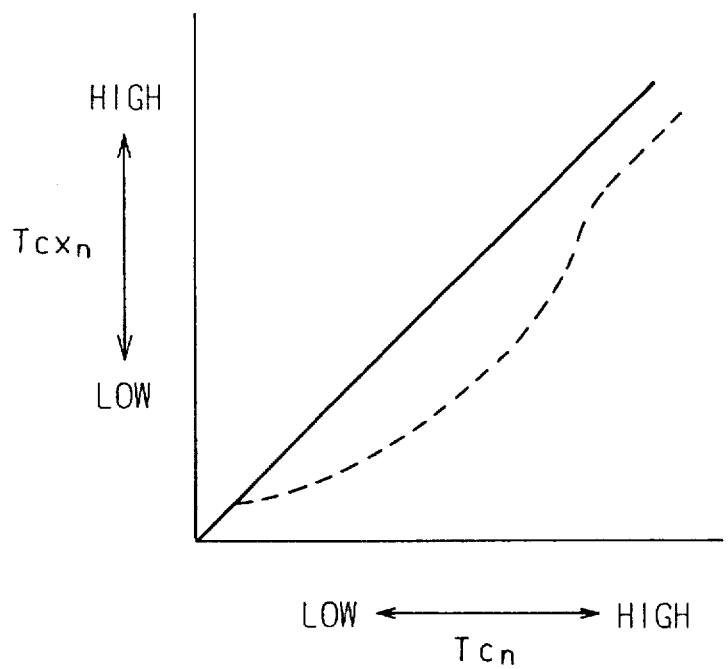

FIG. 2 is a routine for determining the abnormal degree of deterioration of a catalyst;

FIG. 3 is a map for determining an amount of basic reaction heat used in the routine;

FIG. 4 is a map for determining an amount of basic radiation heat used in the routine; and FIG. 5 is a graph which shows a relationship between the assumed temperature of the catalyst and the measured temperature of the catalyst.

DESCRIPTION OF THE PREFERRED EMBODIMENTS

Figure 1:
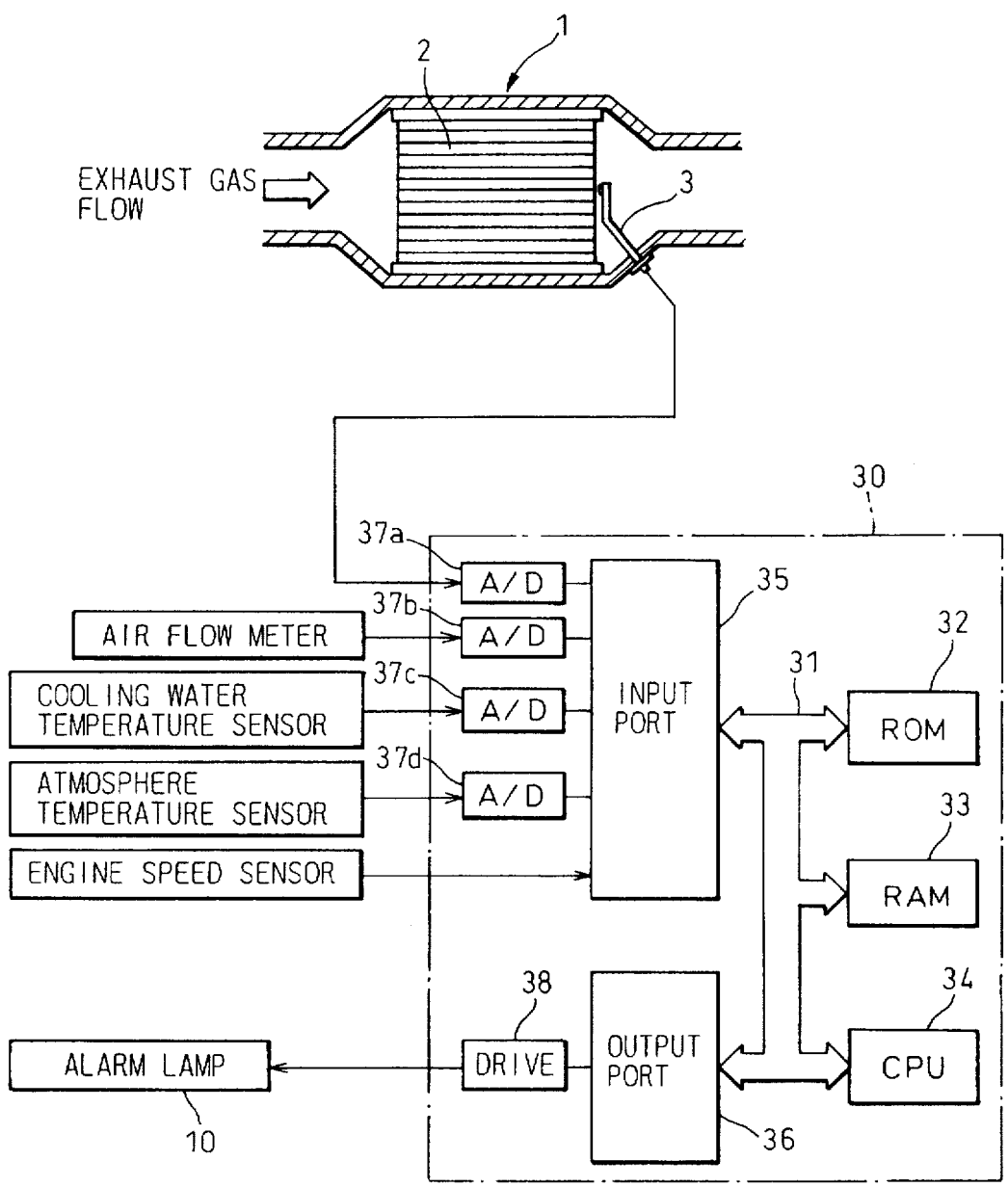
FIG. 1 is a sectional view of a part of an internal combustion engine exhaust system with a device for determining the abnormal degree of deterioration of a catalyst.

FIG. 1 is a sectional view of a part of an internal combustion engine exhaust system with a device for determining the abnormal degree of deterioration of a catalyst according to the present invention. Referring to FIG. 1, reference numeral 1 designates a catalytic converter which purifies the exhaust gas. The upstream side of the catalytic converter 1 is connected to the engine body (not shown). On the other hand, the downstream side thereof is opened, to the atmosphere, via a muffler (not shown). Reference numeral 2 designates a catalytic carrier which carries the catalyst. Reference numeral 3 designates a catalytic temperature sensor which detects a temperature in the center portion of the downstream side of the catalytic carrier 2.

The catalytic converter 1 gradually deteriorates with the use thereof. Once the degree of deterioration of the catalytic converter 1 becomes abnormal, the purification ability thereof becomes very low so that the exchange thereof is necessary. Reference numeral 30 is a device which determines the time for such exchange, i.e., the abnormal degree of deterioration of the catalyst.

The device 30 is an electronic control unit (ECU). The ECU 30 is constructed as a digital computer and includes a ROM (read only memory) 32, a RAM (random access memory) 33, a CPU (microprocessor, etc.) 34, an input port 35, and an output port 36, which are interconnected by a bidirectional bus 31. The output voltages of the catalytic temperature sensor 3 is input into the input port 35 via an AD converters 37a. An engine speed sensor 21, which produces an output pulse representing the engine speed, is connected to the input port 35. An air flow meter 22 produces an output voltage which is proportional to the amount of air fed into the engine cylinder, and this output voltage is input into the input port 35 via an AD converter 37b. A cooling water temperature sensor 23 produces an output voltage which is proportional to the temperature of the engine cooling water, and this output voltage is input into the input port 35 via an AD converter 37c. An atmosphere temperature sensor 24 produces an output voltage which is proportional to the temperature of the atmosphere, and this output voltage is input into the input port 35 via an AD converter 37d. The output port 36 is connected through a drive circuit 38 to an alarm lamp 10 showing that the degree of deterioration of the catalytic converter 1 becomes abnormal.

FIG. 2 shows a routine for determining the abnormal degree of deterioration of the catalytic converter 1. The routine is started simultaneously with the engine starting and is repeated at every predetermined period. First, at step 101, a current measured temperature of the catalyst [$Tcx_n$], a current amount of intake air [$Q_n$], a current engine speed [$Ne_n$], a current temperature of the engine cooling water [$Thw_n$], and a current temperature of the atmosphere [$Ta_n$] are detected by the above-mentioned sensors.

Next, at step 102, it is determined if a flag [F] is [2]. The flag [F] is reset to [0] when the engine is stopped.

Accordingly, the result at step 102 is negative and the routine goes to step 103. At step 103, it is determined if a flag [F] is [1]. The result is negative similarly and the routine goes to step 104.

At step 104, it is determined if a difference between the temperature of the engine cooling water [$Thw_n$] and the temperature of the atmosphere [$Ta_n$] is larger than a predetermined value [A]. When the result is affirmative, the engine has been started again immediately after it was stopped so that the routine goes to step 105 and the flag [F] is made [1] and the routine is stopped. On the other hand, when the result at step 104 is negative, the routine goes to step 106 and the flag [F] is made [2]. Thereafter, the routine goes to step 107.

At step 107, the temperature of the atmosphere [$Ta_n$] is made an assumed temperature of the catalyst at the last time [$Tc_{n-1}$]. At step 108, an amount of basic reaction heat [$BTr_n$] at this time is determined by a map shown in FIG. 3, on the basis of the assumed temperature of the catalyst at the last time [$Tc_{n-1}$]. The amount of basic reaction heat is an amount of heat which is generated by the purification of the exhaust gas in a current temperature of a new catalyst, i.e., a current degree of activation of the new catalyst. Accordingly, the higher the temperature of the catalyst becomes, the larger an amount of basic reaction heat is set on the map shown in FIG. 3.

Next, at step 109, an amount of basic radiation heat at this time [$BTo_n$] is determined by a map shown in FIG. 4, on the basis of the assumed temperature of the catalyst at the last time [$Tc_{n-1}$]. The amount of basic radiation heat is an amount of heat which radiates from the catalyst. Accordingly, the higher the temperature of the catalyst becomes, the larger an amount of basic radiation heat is set on the map shown in FIG. 4.

At step 110, an amount of exhaust gas flowing into the catalytic carrier 2 is calculated by an expression (1), as an amount of calculated intake air [$Qsm_n$].

$$Qsm_n = Qsm_{n-1} + (Q_n - Qsm_{n-1}) * Ne_n / N \quad (1)$$

The expression (1) represents smoothing process of an amount of intake air. In the expression (1), [$Q_n$] is an amount of measured intake air at this time. [$Qsm_{n-1}$] is an amount of calculated intake air at the last time and at the first routine this is set the usual amount of idle intake air, as an initial value immediately after the engine is started. Of course, the initial value can take account of the variation of idle intake air according to the temperature of the engine cooling water [Thw]. [$Ne_n$] is the engine speed. [N] is a predetermined value. The premise of expression (1) is that the lower the current engine speed is, the smaller the absolute value of the varying amount of intake air is.

Next, the routine goes to step 111 and a varying value of the assumed temperature of the catalyst at this time [$dTc_n$] is calculated by an expression (2).

$$dTc_n = K1 * (K2 * Qsm_n + K3 * BTr_n - K4 * BTo_n) \quad (2)$$

In the expression (2), a second correction coefficient [K2] is used to convert the amount of calculated intake air [$Qsm_n$] as the amount of exhaust gas flowing into the catalytic carrier into an amount of heat given to the catalyst by the exhaust gas at this time. The coefficient [K2] takes account of the temperature of the exhaust gas assumed on the basis of a current engine operating condition determined by a current amount of intake air [$Q_n$], a current engine speed [$Ne_n$], a current temperature of the engine cooling water [$Thw_n$], and the like. A third correction coefficient [K3] is used to convert the amount of basic reaction heat [$BTr_n$] at this time which takes account of the degree of activation of the catalyst into an amount of actual reaction heat. The coefficient [K3] takes account of the amount of exhaust gas and the air-fuel ratio determined on the basis of the current engine operating condition. A fourth correction coefficient [K4] is used to convert the amount of basic radiation heat [$BTo_n$] at this time which takes account of the temperature of the catalyst into an amount of actual radiation heat. The coefficient [K4] takes account of the temperature of the atmosphere [$Ta_n$] and the amount of exhaust gas. Thus, the second coefficient [K2], the third coefficient [K3], and the fourth coefficient [K4] are again determined by the use of maps (not shown) when the process at step 111 is repeated. On the other hand, a first correction coefficient [K1] is used to convert an amount of heat which increases or decrease in such manner in the catalyst into a varying value of the temperature in the center portion of the downstream side of the catalyst carrier 2.

Next, the routine goes to step 112 and an assumed temperature of the catalyst at this time [$Tc_n$] is calculated in a manner that the varying value of the assumed temperature of the catalyst [$dTc_n$] is added to the assumed temperature of the catalyst at the last time [$Tc_{n-1}$]. Next, at step 113, a temperature in the center portion of the downstream side of the catalytic carrier 2 [$Tcx_n$] measured by the catalytic temperature sensor 3 is read in.

Next, the routine goes to step 114 and it is determined if the assumed temperature of the catalyst at this time [$Tc_n$] is within a predetermined range [a–b] which is explained as follows. When the result is affirmative, the routine goes to step 115. A ratio of a varying value between the measured temperatures of the catalyst at this time and at the last time [$Tcx_n - Tcx_{n-1}$] to the varying value of the assumed temperature of the catalyst [$dTc_n$] is calculated. It is determined if the ratio [$(Tcx_n - Tcx_{n-1})/dTc_n$] is smaller than a predetermined value [c]. When the result is negative, it is determined that the degree of deterioration of the catalyst is normal and the routine is stopped. On the other hand, when the result at step 115 is affirmative, the routine goes to step 116 and it is determined that the degree of deterioration of the catalyst is abnormal and this is informed to the driver by an alarm lamp 10.

FIG. 5 is a graph which shows a relationship between the assumed temperature of the catalyst [$Tc_n$] and the measured temperature of the catalyst [$Tcx_n$]. As shown by the solid line in FIG. 5, if the catalyst is new, the assumed temperature of the catalyst [$Tc_n$] on the basis of the engine operating condition should be equal to the measured temperature of the catalyst [$Tcx_n$]. However, once the catalyst deteriorates, the purification reaction thereof becomes poor so that the measured temperature thereof [$Tcx_n$] is always lower than the assumed temperature thereof [$Tc_n$] after the catalyst starts the purification reaction, as shown by the dot line. In the catalytic carrier 2, the upstream side thereof deteriorates easily because the upstream side thereof is exposed to the non-purified exhaust gas. Therefore, only the degree of deterioration of the upstream side of the catalyst can be abnormal. In this case, even if the actual temperature of the catalyst reaches the purification starting temperature at which the catalyst activates partly, the purification reaction does not start sufficiently because the initial stage of the purification is carried out by the upstream side of the catalyst. Therefore, in the initial stage of the purification, a rising value per unit of time in the actual temperature of the catalyst becomes very small. However, thereafter, once the actual temperature of the catalyst rises more and the catalyst activates generally, the catalyst has a relative good purification ability so that in the latter state of the purification, a rising value per unit of time in the actual temperature of the catalyst becomes about the same value in case of a new catalyst.

In the routine of FIG. 2, it is determined if a ratio of the varying value of the measured temperature of the catalyst per unit of time $[Tcx_n - Tcx_{n-1}]$ to the varying value of the assumed temperature of the catalyst per unit of time $[dTc_n]$ is smaller than the predetermined value [c]. When the result is affirmative, i.e., when an inclination of the dotted line in FIG. 5 is smaller than an inclination [c] in a catalyst of which the degree of deterioration is the maximum permissible limit, it is determined that the degree of deterioration of the catalyst is abnormal. Even if the purification starting temperature of the catalyst is not assumed accurately and each assumed temperature of the catalyst is not comparatively accurate, the varying value of the assumed temperature of the catalyst $[dTc_n]$ is reliable so that the ratio calculated at step 115 is reliable. Accordingly, it can be determined accurately if the degree of deterioration of the catalyst is abnormal.

The determination at step 115 is carried out only when the assumed temperature of the catalyst is within the predetermined range [a–b] in which the above-mentioned inclination becomes small and notably in accordance with the deterioration of the catalyst by the determination at step 114. Accordingly, the reliability of the determination at step 115 is further improved.

The premise of the present routine is that when the engine is started, the temperature of the catalyst is nearly equal to the temperature of the atmosphere [Ta], and assumes the temperature of the catalyst [Tc]. Accordingly, when the result at step 104 is affirmative, i.e., when the engine is started again immediately after it was stopped, the flat [F] is made [1] and thereafter the result at step 103 remains affirmative and thus the routine is stopped without determining the degree of deterioration of the catalyst. If the result at step 104 is negative when the engine is started, the flag [F] is made [2] and thereafter the result at step 102 remains affirmative and thus the process after step 108 is repeated.

In the routine of FIG. 2, the assumed temperature of the catalyst is calculated as if the catalyst is a new one. The assumed temperature of the catalyst may be calculated as if the degree of deterioration of the catalyst is a predetermined degree. In this case, the range [a–b] at step 114 and the threshold [c] at step 115 must be changed in accordance with the predetermined degree of deterioration of the catalyst. In the case that the predetermined degree is the maximum permissible limit, the threshold [c] is [1] or near [1] to take account of a margin.

The actual temperature of catalyst is measured on the center portion of the downstream side of the catalytic carrier 2. The point of the measured temperature of the catalyst with the point of the assumed temperature thereof can be made the center portion of the upstream side thereof or any portion thereof.

Although the invention has been described with reference to specific embodiments thereof, it should be apparent that numerous modifications can be made thereto by those skilled in the art, without departing from the basic concept and scope of the invention.

We claim:

1. A device for determining the abnormal degree of deterioration of catalyst of a catalytic converter arranged in an internal combustion engine exhaust system, comprising:

measuring means for measuring a temperature of said catalyst;

assuming means for assuming a temperature of said catalyst on the basis of the engine operating condition;

calculating means for calculating a ratio of a varying value of the measured temperature by said measuring means to a varying value of the assumed temperature by said assuming means; and determining means for determining that the degree of deterioration of said catalyst is abnormal when said ratio is smaller than a predetermined value.

2. A device according to claim 1, wherein said determining means determines the abnormal degree of deterioration of said catalyst only when said assumed temperature is within a temperature range of said catalyst in the initial stage of the purification of said catalyst.

3. A device according to claim 1, wherein said measuring means measures a temperature of said catalyst on the center portion of the downstream side of said catalytic converter, and said assuming means assumes a temperature of said catalyst on the center portion of the downstream side of said catalytic converter.

* * * * *